(12) United States Patent  
Segawa

(10) Patent No.: US 7,766,141 B2  
(45) Date of Patent: Aug. 3, 2010

(54) OUTER RETAINER FOR ONE-WAY CLUTCH

(75) Inventor: Hiroki Segawa, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 12/202,266

(22) Filed: Aug. 30, 2008

(65) Prior Publication Data

US 2009/0057091 A1    Mar. 5, 2009

(30) Foreign Application Priority Data

Aug. 30, 2007    (JP) .............................. 2007-224475

(51) Int. Cl.
*F16D 41/07*    (2006.01)
(52) U.S. Cl. ................................. 192/45.1; 192/41 A
(58) Field of Classification Search ........................ None
See application file for complete search history.

(56) References Cited

U.S. PATENT DOCUMENTS

| | | | | |
|---|---|---|---|---|
| 4,882,941 A | * | 11/1989 | Kinoshita | .................. 192/45.1 |
| 5,000,303 A | * | 3/1991 | Shoji et al. | .................. 192/45.1 |
| 5,480,013 A | * | 1/1996 | Fujiwara et al. | ............ 192/45.1 |
| 5,526,911 A | * | 6/1996 | Kinoshita | .................. 192/45.1 |
| 5,979,626 A | * | 11/1999 | Igari et al. | .................. 192/45.1 |
| 6,125,978 A | * | 10/2000 | Ando et al. | ................ 192/41 A |

FOREIGN PATENT DOCUMENTS

| | | |
|---|---|---|
| JP | 62-188632 U | 12/1987 |
| JP | 06-22630 U | 3/1994 |

* cited by examiner

*Primary Examiner*—Richard M. Lorence
(74) *Attorney, Agent, or Firm*—Miles & Stockbridge P.C.

(57) ABSTRACT

An outer retainer for a one-way clutch has a cylindrical portion and a flange portion extending radially outward from an axial end of the cylindrical portion. The flange portion has three or more arc-shaped major parts disposed circumferentially and arc-shaped minor parts, each adjacent two of the major parts being connected to one another through a minor part, the major and minor parts projecting radially outward to different extents, and the arc-shape of the major and minor parts constituting continuously the shape of the outer periphery of the flange portion.

3 Claims, 3 Drawing Sheets

OUTER RETAINER FOR ONE-WAY CLUTCH

This application claims the benefit of Japanese Patent Application No. 2007-224475 which is hereby incorporated by reference.

BACKGROUND OF THE INVENTION

1. Field of the Invention

The present invention relates to an outer retainer for a one-way clutch which is used in an automatic transmission, or the like, of a vehicle.

2. Related Background Art

In an automatic transmission or the like of a vehicle, a one-way clutch for transmitting a rotation force on a driving side in one direction only and not transmitting the force in an opposite direction is used.

A conventional one-way clutch of a sprag type is comprised of an inner race and an outer race which are coaxially provided to rotate relatively to each other and a one-way clutch mechanism which is interposed between the inner race and the outer race. The one-way clutch mechanism is comprised of a plurality of sprags serving as torque transmitting members, a spring member for urging the sprags in a direction of engagement, cylindrical inner retainer and outer retainer for retaining the sprags and preventing their excessive inclination, and a pair of end bearings for retaining these retainers with a predetermined space therebetween so as to secure an operation of the sprags.

The outer retainer has a cylindrical portion and a flange portion which extends outward in the radial direction from one end of the cylindrical portion. The cylindrical portion is provided with a plurality of rectangular windows formed in the circumferential direction at predetermined intervals, correspondingly to the respective sprags in order to retain the sprags in the circumferential direction. The cylindrical portion and the flange portion are formed integrally.

The inner retainer has substantially the same structure as that of the outer retainer, except that a flange portion which is formed on one end in the axial direction is an inward flange which is bent inward in the radial direction.

In the one-way clutch having such a structure, when the outer race serves as a driving race for acting the rotating force on the sprags to transmit the torque, it is necessary to make proper dragging torque act between the outer retainer and the inner peripheral surface of the outer race in order to securely transmit, even if a sudden action is applied on the outer race, the action to the sprags.

As a means for obtaining such a dragging torque, Japanese Utility Model Application Laid-Open No. 62-188632 discloses that the entire outer retainer including the outward flange is formed in an elliptical shape, and the flange portion on the outer side and the inner peripheral surface of the outer ring are brought into contact at both ends in the major axis direction of this ellipse. With this structure, a necessary dragging torque is obtained.

In such a conventional outer retainer, the diameter in the major axis direction of the outer retainer taking an elliptic shape is formed to be slightly larger than the inner diameter of the outer race. For this reason, in a state where the outer retainer is attached to the inner peripheral surface of the outer race, the outer retainer is secured to the inner peripheral surface of the outer race by a spring action which is caused by distortion of the entire outer retainer.

Japanese Utility Model Application Laid-Open No. 06-22630 discloses an outer retainer which is formed in an elliptical shape, in which a cut-away portion is formed in a part of the flange portion in the circumferential direction, so that a spring property of the entire retainer can be easily obtained.

As described above, in the conventional elliptically-formed outer retainer, since the flange portion and the inner peripheral surface of the outer race are brought into contact at both ends of the elliptic form in the major axis direction thereof, the contact with the inner peripheral surface of the outer race is two-point contact. Conventionally, the outer retainer is formed in an elliptic form because the primary object thereof is to obtain a dragging torque with respect to the inner peripheral surface of the outer race. So the contact at two points with the inner peripheral surface of the outer race has no special problem.

However, in a state that the outer retainer is attached on the inner peripheral surface of the outer race, assuming that the flange portion of the outer retainer serves as means for preventing the outer retainer from falling out of the inner peripheral surface of the outer race in the axial direction, the posture of the outer retainer is ill-balanced if the flange portion is in contact with the inner peripheral surface of the outer race only at two points. That is, since the outer retainer is supported to the inner peripheral surface of the outer race at two points, the posture of the outer retainer is unstable.

Also, when the flange portion is formed with a cut-away part, as in the retainer disclosed in the Japanese Utility Model Application Laid-Open No. 06-22630, since the retainer is produced by press-working, the life of the pressing machine or a constituents parts thereof such as a punch also greatly affects the cost. Moreover, the pressing process itself becomes complicated, thereby further increasing the cost.

In assembling the outer retainer, the outer retainer is flexed to be inserted into the inner peripheral surface of the outer race. However, if a cut-away part is formed in the flange portion, the rigidity of the retainer in the circumferential direction becomes low so that the retainer may be flexed more than necessary. As a result, it is feared that the strength of the outer retainer itself may be lowered.

On the other hand, if there is a partial cut-away part at the flange portion, an edge of the flange would cause the metal mold to chip. As a result, the thermal processing may become difficult.

SUMMARY OF THE INVENTION

The present invention has been contrived to take such circumstances into consideration, and an object thereof is to provide an outer retainer for a one-way clutch which can maintain a stable posture in a state of being mounted, is easy to be inserted into the inner peripheral surface of the outer race when it is mounted, and can be manufactured at a low cost.

In order to solve the above problems, according to the present invention, there is provided an outer retainer for a one-way clutch, which one-way clutch comprises:

an outer diameter-side member having an inner peripheral surface;

an inner diameter-side member having an outer peripheral surface opposed to the inner peripheral surface;

a plurality of torque transmitting members which are interposed between the inner peripheral surface of the outer diameter-side member and the outer peripheral surface of the inner diameter-side member and are provided to be inclinable at positions where they are engaged with the inner and outer peripheral surfaces to transmit a torque and at positions where they are not engaged with the inner and outer peripheral surfaces;

a spring member for urging the plurality of torque transmitting members in a direction of engaging with the inner and outer peripheral surfaces; and cylindrical inner retainer and outer retainer for retaining the plurality of torque transmitting members in the circumferential direction at predetermined intervals and controlling their inclination, the outer retainer comprising a cylindrical portion and a flange portion extended from one end of the cylindrical portion in the axial direction outwardly in the radial direction, and the cylindrical portion being provided with a plurality of windows for retaining the torque transmitting members in the circumferential direction at predetermined intervals, said outer retainer being characterized in that:

the flange portion has three or more arc-shaped major circular parts in the circumferential direction whose outer peripheral sides project more outwardly in the radial direction than the inner peripheral surface of the outer diameter-side member.

The outer retainer for a one-way clutch is preferably characterized in that the arc-shape of the major circular part has the radius of curvature which is smaller than the radius of curvature of the inner peripheral surface of the outer diameter-side member, each adjacent two of the major circular parts are connected to each other through a minor circular part having an arc shape extending outwardly in the radial direction on its outer peripheral side and having a greater radius of curvature than the radius of curvature of the inner peripheral surface of the outer diameter-side member, and the arc shape of the major circular part and the arc shape of the minor circular part constitute the shape of the outer periphery of the flange portion.

The outer retainer for a one-way clutch is further preferably characterized in that the major circular parts are latched by a concave groove which is provided in the circumferential direction in the vicinity of an end on one side in the axial direction of the inner peripheral surface of the outer diameter-side member, so as to serve as means to prevent the outer retainer from falling off from the outer diameter-side member in the axial direction.

According to the present invention, it is possible to provide an outer retainer for a one-way clutch which can maintain a stable posture in a state of being mounted, is easy to be inserted into the inner peripheral surface of the outer race when it is mounted, and can be manufactured at a low cost.

DESCRIPTION OF THE PREFERRED EMBODIMENTS

An embodiment of the present invention will be described in the following with reference to the drawings.

Figure 1:
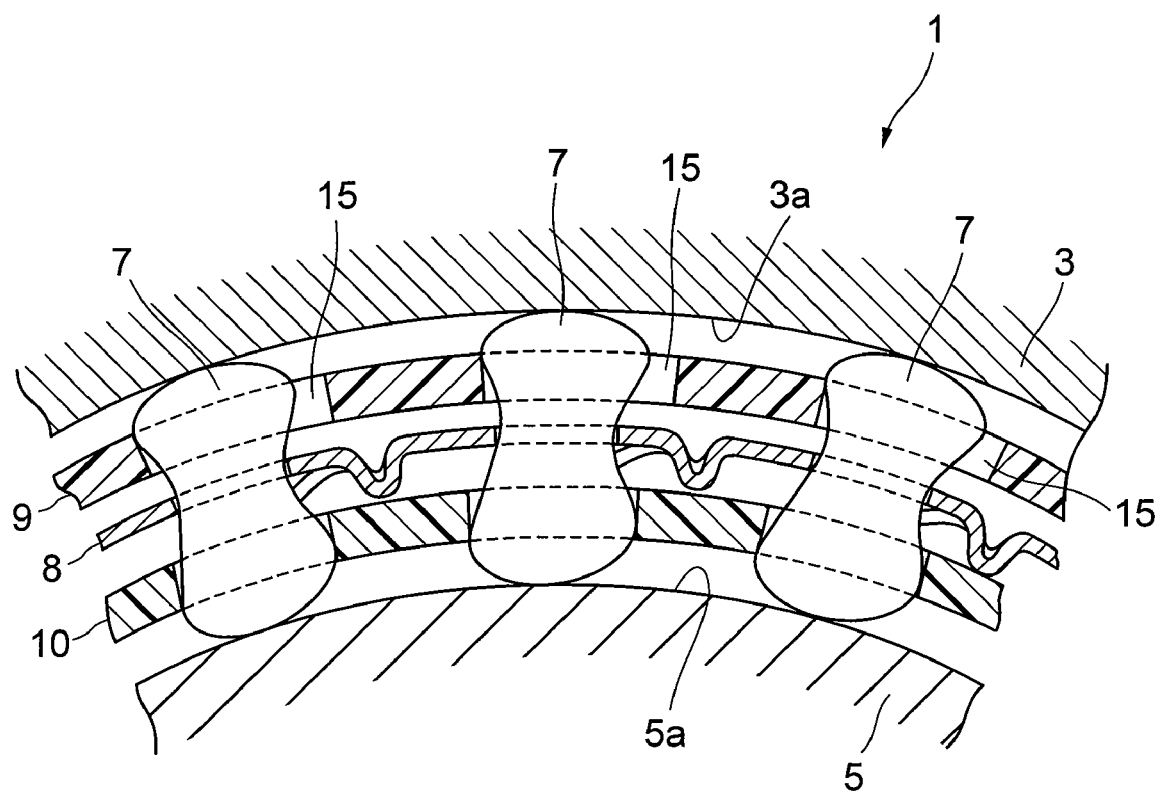
FIG. 1 is a cross-sectional view showing the essential part of a one-way clutch which is provided with an outer retainer for a one-way clutch according to an embodiment of the present invention, seen in the axial direction.

FIG. 1 is a cross-sectional view showing the essential part of a one-way clutch which is provided with an outer retainer for a one-way clutch according to an embodiment of the present invention, seen in the axial direction.

The one-way clutch 1 is comprised of an outer race 3 which serves as an outer diameter-side member having an inner peripheral surface 3a, an inner race 5 which serves as an inner diameter-side member having an outer peripheral surface 5a opposed to the inner peripheral surface 3a in the radial direction, a plurality of sprags 7 which are interposed between the inner peripheral surface 3a of the outer race 3 and the outer peripheral surface 5a of the inner race 5 and are provided to be inclinable at positions for engaging with the inner and outer peripheral surfaces 3a and 5a for transmitting a torque or at positions of not engaging with the inner and outer peripheral surfaces 3a and 5a, a ribbon spring 8 for urging the plurality of sprags 7 in the direction of engagement with the inner and outer peripheral surfaces 3a and 5a, and cylindrical outer retainer 9 and inner retainer 10 for retaining the plurality of sprags 7 in the circumferential direction at predetermined intervals and also for controlling their inclination.

Figure 2:
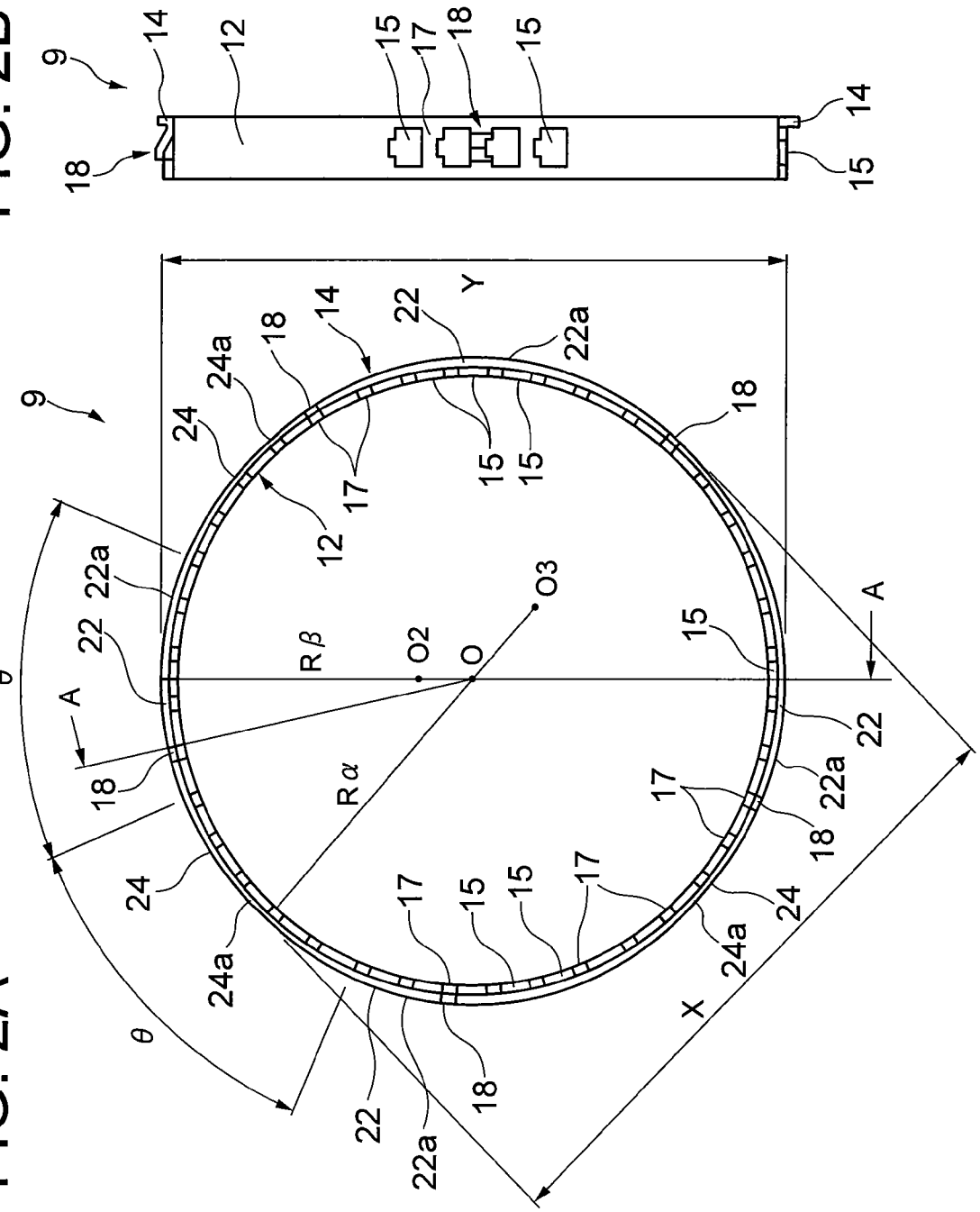
FIG. 2A is an entire view of the outer retainer for a one-way clutch according to the embodiment, seen in the axial direction.
FIG. 2B is a cross-sectional view showing a cross section of the outer retainer along the line A-O-A in FIG. 2A.

FIG. 2A is an entire view of the outer retainer 9 which is used in the one-way clutch 1, seen in the axial direction, and FIG. 2B is a cross-sectional view showing a cross section along the line A-O-A in FIG. 2A. (FIG. 2B shows some of a plurality of windows 15 and columns 17 which will be described later).

As shown in FIGS. 2A and 2B, the outer retainer 9 is comprised of a cylindrical portion 12 and a flange portion 14 which is extended outwardly in the radial direction from one end of the cylindrical portion 12 in the axial direction. The cylindrical portion 12 and the flange portion 14 are formed integrally. Each of the sprags 7 is fitted in the cylindrical portion 12 correspondingly, and a plurality of windows 15 each having a substantially rectangular shape for retaining the corresponding sprag as being inclinable are formed in the circumferential direction at predetermined intervals. A column 17 is formed between each two adjacent windows 15, 15.

In the present embodiment, in order to obtain a dragging torque with the inner peripheral surface of the outer race, a part called an i bar is formed on a predetermined column. The i bar 18 is formed by cutting a part around the central portion of the column 17 so as to make adjacent two windows 15 communicate with each other. Thus, the i bar 18 having an i shape is obtained. Arrangement of the present embodiment is made such that a plurality of such columns 17 are provided at predetermined intervals, and one cut apart piece of such a column 17 is bent outwardly in the radial direction to serve as an elastic piece, so that the dragging torque is obtained by bringing the outer peripheral side of the elastic piece into contact with the inner peripheral surface 3a of the outer race owing to a spring action of such elastic pieces. In the present embodiment, such i bars 18 are formed on five columns 17.

Figure 3:
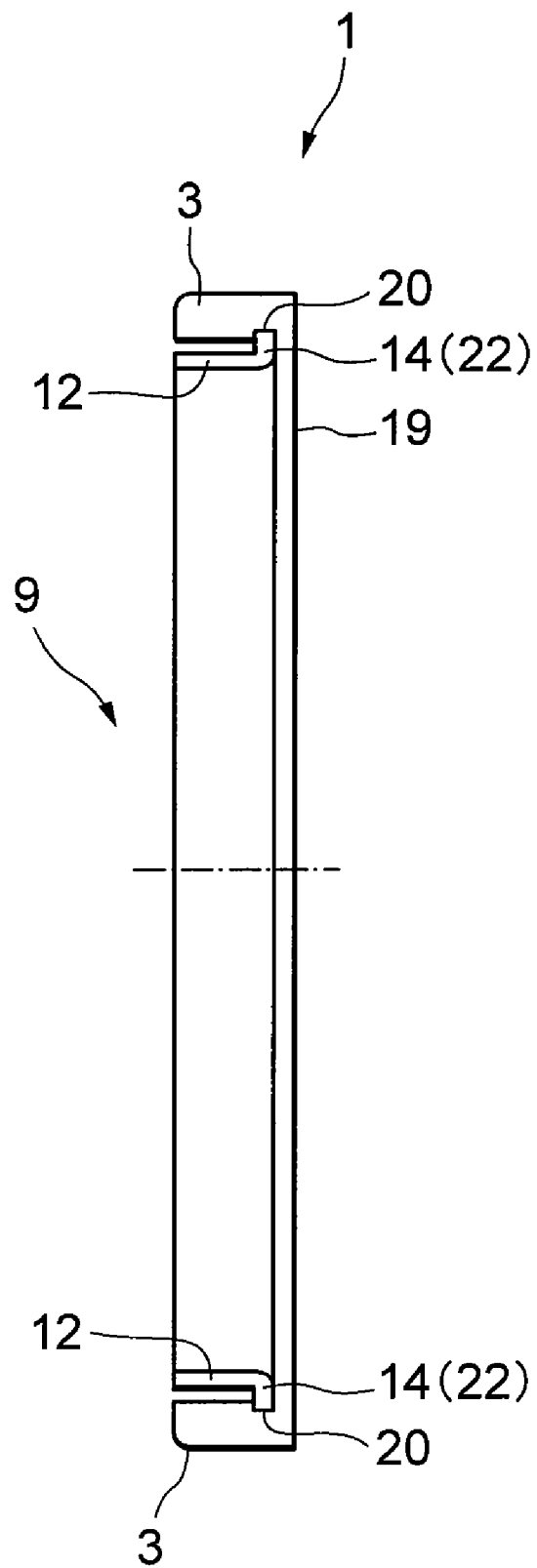
FIG. 3 is a cross-sectional view of the outer retainer for a one-way clutch according to the embodiment, being attached to the outer diameter-side member, seen in the radial direction.

FIG. 3 is a cross-sectional view showing a state that the outer retainer 9 is attached on the inner peripheral surface 3a of the outer race 3, seen in the radial direction. In the present embodiment, on one end of the outer race 3, a part which is extended inwardly in the radial direction from this end is integrally formed. This extended part constitutes a disc portion 19, which serves to close the end of the outer race 3. The outer race 3 and the disc portion 19 constitute the outer diameter-side member of the one-way clutch 1. At the base of the outer race on the disc portion 19 side, a latch groove 20 is formed along the entire circumference of the inner peripheral surface 3a. The flange portion 14 of the outer retainer 9 is latched by the latch groove 20. The shape of the flange portion 14 will be detailedly described below, with reference to FIG. 2.

As described above, the outer retainer 9 is comprised of the cylindrical portion 12 and the flange portion 14 which is extended outwardly in the radial direction from one end of the cylindrical portion 12 in the axial direction. The cylindrical portion 12 and the flange portion 14 are formed integrally.

The shape of the cylindrical portion 12, seen in the axial direction, is substantially a true circle. On the other hand, the shape of the outer periphery of the flange portion 14, seen in the axial direction, is not a single circle having one center, but is constituted by a plurality of arcs of circles each having a different radius of curvature combined with each other. That is, a plurality of arcs 22a largely projecting outwardly in the radial directional from the cylindrical portion 12 and less projecting arcs 24a in the radial direction for connecting each two adjacent largely projecting arcs 22a constitute a substantially circular shape.

The radius of curvature of the largely projecting arc 22a is smaller than that of the outer race 3 on the inner diameter side, which is formed substantially as a true circle, that is, the inner peripheral surface 3a of the outer race. On the other hand, the radius of curvature of the less projecting arc 24a is formed greater than that of the inner peripheral surface 3a of the outer race. In the present embodiment, four largely projecting arcs 22a alternate with four less projecting arcs 24a for connecting two adjacent largely projecting arcs 22a, thereby constituting the shape of the outer periphery of the flange portion 14.

The center O2 of the circle containing the largely projecting arc 22a is positioned on the line Rβ which connects the center of the arc 22a in the circumferential direction and the center O of the cylindrical portion 12. The center O3 of the circle containing the less projecting arc 24a is positioned on the line Rα which connects the center of the arc 24a in the circumferential direction and the center O of the cylindrical portion 12. A largely projecting part formed by the arc 22a constitutes a major circular part 22 of the flange portion 14, while a less projecting part formed by the arc 24a constitutes a minor circular part 24 of the flange portion 14.

Though each of a plurality of major circular parts 22 has the center O2 of the circle at a different position, the radii of curvature of the major circular parts 22 and all the lengths of the arcs 22a each constituting the outer periphery of the flange portion 14 are, respectively, the same. The minor circular parts 24 have the center O3 of the circle at different positions in the same manner, and the radii of curvature of the minor circular parts 24 and all the lengths of the arcs 24a each constituting the outer periphery of the flange portion 14 are, respectively, the same.

The arc 22a of each major circular part 22 and the arc 24a of each minor circular part 24, each constitutes a part of the outer periphery of the flange portion 14 which is corresponding to a range of an angle θ from the center O of the cylindrical portion 12. In the present embodiment, since the total number of the arcs 22a of the major circular part 22 and the arcs 24a of the minor circular part 24 is eight, arrangement is made such that the angle θ is 45°, one major circular part 22 is opposite to another major circular part 22 with the center O of the cylindrical portion 12 therebetween, and one minor circular part 24 is opposite to another minor circular part 24 with the center O therebetween. Therefore, the distance Y between the apexes of the opposite major circular parts 22, 22 is larger than the distance X between the apexes of the opposite minor circular parts 24, 24.

The inner peripheral surface 3a of the outer race is formed to have a cross section, seen in the axial direction, in a substantially true circular shape. The length in the radial direction from the center O of the cylindrical portion 12 to the outer periphery of the major circular part 22 constituting the flange portion 14 is greater than the radius of the inner peripheral surface 3a of the outer race, i.e., the length in the radial direction from the center O to the inner peripheral surface 3a of the outer race. That is, the flange portion 14 has a part that projects more outward in the radial direction than the inner peripheral surface 3a of the outer race. In other words, the flange portion 14 has a part which projects more outward than the circle of the cross section of the inner peripheral surface 3a of the outer race. In the present embodiment, the flange portion 14 has four major circular parts 22. As a result, the number of the projecting parts is four. On the other hand, the length in the radial direction from the center O of the cylindrical portion 12 to the outer periphery of the minor circular part 24 is smaller than the length in the radial direction from the center O to the inner peripheral surface 3a of the outer race.

The flange portion 14 of the outer retainer 9 is, as described above, and as shown in FIG. 3, latched by the latch groove 20 which is formed on the inner peripheral surface 3a of the outer race. That is, a projecting part of the flange portion, i.e., the major circular part 22, is latched by the latch groove 20 on the inner peripheral surface 3a of the outer race. Since the major circular part 22 of the flange portion 14 is thus latched by the latch groove 20, the outer retainer 9 is prevented from falling out from the inner peripheral surface 3a of the outer race in the axial direction.

In the present embodiment, since the major circular parts 22 are provided at four positions, the outer retainer 9 is supported on the inner peripheral surface 3a of the outer race at four points. For this reason, stability of the posture of the outer retainer 9 is conspicuously improved, compared with that of the conventional structure in an elliptical form with two supporting points. These major circular parts 22, 22 are means for preventing the outer retainer from falling out. However, it is possible for the major circular parts 22, 22 to obtain the dragging torque with respect to the inner peripheral surface 3a of the outer race, together with the above-described i bar 18.

Since the flange portion 14 is radially smaller in the minor circular part 24, the outer retainer 9 can be flexed in this part. Thus, it is possible to insert the outer retainer 9 into the inner peripheral surface 3a of the outer race easily. In mounting to the inner peripheral surface 3a of the outer race, since the outer retainer 9 is inserted into the inner peripheral surface 3a of the outer race by flexing the radially smaller part of the flange portion 14, it is no longer required to provide a cut-away part on the outer retainer 9. Thus, the cutting process can be omitted. As a result, the cost can be reduced. Further, since the flange portion 14 has no cut-away part, the rigidity of the outer retainer 9 in the circumferential direction can be maintained, so that only a necessary part can be flexed. As a result, reduction in strength of the outer retainer 9 itself can be prevented. Moreover, since the flange portion is not chipped, the flange portion has no edge so that the metal mold can be prevented from being chipped.

In the outer retainer 9 in the present embodiment, it is arranged such that the flange portion 14 has four major circular parts 22, i.e., the projecting portions. However, it is suffice if there is three or more projecting portions. That is, since the outer retainer 9 is contacted with the inner peripheral surface 3a of the outer race at three points or more, it is possible to improve the stability of the posture of the outer retainer in a state of being mounted. When there are provided three projecting portions, there should be provided three minor circular parts also. As described above, the present invention is not limited to the foregoing embodiment, but can be altered in various manners.

What is claimed is:

1. An improved outer retainer for use in a one-way clutch, that comprises:
    an outer diameter-side member having an inner peripheral surface;
    an inner diameter-side member having an outer peripheral surface opposed to said inner peripheral surface;
    a plurality of torque transmitting members which are interposed between said inner peripheral surface of said outer diameter-side member and said outer peripheral surface of said inner diameter-side member and are provided to be inclinable at positions where they are engaged with said inner and outer peripheral surfaces to transmit a torque and at positions where they are not engaged with said inner and outer peripheral surfaces;
    a spring member for urging said plurality of torque transmitting members in a direction of engaging with said inner and outer peripheral surfaces;
    a cylindrical inner retainer and an outer retainer for retaining said plurality of torque transmitting members at predetermined circumferential intervals and controlling their inclination, said outer retainer comprising a cylindrical portion and a flange portion extending radially outward from one axial end of said cylindrical portion, and said cylindrical portion being provided with a plurality of windows for retaining said torque transmitting members at predetermined circumferential intervals,
    said improved outer retainer being characterized in that:
    said flange portion has three or more arc-shaped major parts disposed circumferentially and having outer peripheral sides that project further radially outward than said inner peripheral surface of said outer diameter-side member, and arc-shaped minor parts projecting less radially outward than said major arc-shaped parts; each adjacent two of said major arc-shaped parts being connected to one another through an arc-shaped minor part, said arc shape of said major arc-shaped parts and said arc shape of said minor arc-shaped parts constituting continuously the shape of the outer periphery of said flange portion.

2. An improved outer retainer for use in a one-way clutch that comprises:
    an outer diameter-side member having an inner peripheral surface;
    an inner diameter-side member having an outer peripheral surface opposed to said inner peripheral surface;
    a plurality of torque transmitting members which are interposed between said inner peripheral surface of said outer diameter-side member and said outer peripheral surface of said inner diameter-side member and are provided to be inclinable at positions where they are engaged with said inner and outer peripheral surfaces to transmit a torque and at positions where they are not engaged with said inner and outer peripheral surfaces;
    a spring member for urging said plurality of torque transmitting members in a direction of engaging with said inner and outer peripheral surfaces; and
    a cylindrical inner retainer and an outer retainer for retaining said plurality of torque transmitting members at predetermined circumferential intervals and controlling their inclination, said outer retainer comprising a cylindrical portion and a flange portion extending radially outward from one axial end of said cylindrical portion, and said cylindrical portion being provided with a plurality of windows for retaining said torque transmitting members at predetermined circumferential intervals,
    said improved outer retainer being characterized in that:
    said flange portion has three or more arc-shaped major parts disposed circumferentially and having outer peripheral sides that project further radially outward than said inner peripheral surface of said outer diameter-side member,
    the arc-shape of each major part has a radius of curvature which is smaller than a radius of curvature of said inner peripheral surface of said outer diameter-side member, each adjacent two of said major arc-shaped parts are connected to one another through a minor circular arc-shaped part projecting radially outward on its outer peripheral side and having a greater radius of curvature than the radius of curvature of said inner peripheral surface of said outer diameter-side member, and the arc shape of said major arc-shaped parts and the arc shape of said minor arc-shaped parts constituting continuously the shape of the outer periphery of said flange portion.

3. The improved outer retainer for use in a one-way clutch according to claim 2, wherein said major arc-shaped parts are latched by a concave circumferential groove in the vicinity of an axial end of said inner peripheral surface of said outer diameter-side member, so as to prevent said outer retainer from falling off axially from said outer diameter-side member.

* * * * *